US011942014B2

(12) United States Patent

Nishio et al.

(10) Patent No.: US 11,942,014 B2

(45) Date of Patent: Mar. 26, 2024

(54) DISPLAY DEVICE AND DRIVING METHOD

(71) Applicant: SHARP KABUSHIKI KAISHA, Sakai (JP)

(72) Inventors: Masaaki Nishio, Sakai (JP); Hongbing Weng, Sakai (JP); Kazuo Nakamura, Sakai (JP); Noriyuki Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 70 days.

(21) Appl. No.: 17/767,379

(22) PCT Filed: Oct. 10, 2019

(86) PCT No.: PCT/JP2019/040018

§ 371 (c)(1),
(2) Date: Apr. 7, 2022

(87) PCT Pub. No.: WO2021/070326

PCT Pub. Date: Apr. 15, 2021

(65) Prior Publication Data

US 2023/0274681 A1 Aug. 31, 2023

(51) Int. Cl.

*G09G 3/20* (2006.01)
*G09G 3/30* (2006.01)

(52) U.S. Cl.

CPC ............. *G09G 3/2007* (2013.01); *G09G 3/30* (2013.01); *G09G 2320/0233* (2013.01); *G09G 2360/16* (2013.01)

(58) Field of Classification Search

None

See application file for complete search history.

(56) References Cited

U.S. PATENT DOCUMENTS

| | | | | |
|---|---|---|---|---|
| 2004/0239587 | A1 | 12/2004 | Murata et al. | |
| 2018/0330665 | A1 | 11/2018 | Fujii et al. | |
| 2019/0156763 | A1 | 5/2019 | Furihata et al. | |
| 2019/0279567 | A1 | 9/2019 | Hwang et al. | |
| 2022/0358881 | A1 * | 11/2022 | Chae .................... | G09G 3/3266 |

FOREIGN PATENT DOCUMENTS

| | | | |
|---|---|---|---|
| JP | H057354 | A | 1/1993 |
| JP | 2004-301964 | A | 10/2004 |
| JP | 2010-101926 | A | 5/2010 |
| JP | 2019-095527 | A | 6/2019 |

* cited by examiner

*Primary Examiner* — Nicholas J Lee

(74) *Attorney, Agent, or Firm* — ScienBiziP, P.C.

(57) ABSTRACT

A display device according to an aspect of the disclosure includes a pixel circuits, a scanning signal line, a data signal line, a first power supply voltage line, a second power supply voltage line, a scanning signal line drive circuit, a data signal line drive circuit, and a display control unit. The display control unit compares data values written in pixels in an n-th row corresponding to the selected scanning signal line with data values written in pixels in an (n−1)-th row which is one row prior to the n-th row of the selected scanning signal line, and corrects the data voltage corresponding to the pixels in the n-th row in a case where a difference between the data values is equal to or greater than a threshold value.

20 Claims, 13 Drawing Sheets

| | 1RGB | | | ⋯ | 200RGB | | | 201RGB | | | ⋯ | 500RGB | | | 501RGB | | | ⋯ | 1080RGB | | |
|---|---|---|---|---|---|---|---|---|---|---|---|---|---|---|---|---|---|---|---|---|---|
| | S1 | S2 | S3 | ⋯ | S598 | S599 | S600 | S601 | S602 | S603 | ⋯ | S1498 | S1499 | S1500 | S1501 | S1502 | S1503 | ⋯ | S3238 | S3239 | S3240 |
| G1 | | | | | | | | | | | | | | | | | | | | | |
| G2 | | | | | | | | | | | | | | | | | | | | | |
| ⋯ | | | | | | | | | | | | | | | | | | | | | |
| G200 | | | | | 255 | 255 | 255 | 255 | 255 | 255 | | 255 | 255 | 255 | 255 | 255 | 255 | | | | |
| G201 | | | | | 255 | 255 | 255 | 0 | 0 | 0 | | 0 | 0 | 0 | 255 | 255 | 255 | | | | |
| G202 | | | | | 255 | 255 | 255 | 0 | 0 | 0 | | 0 | 0 | 0 | 255 | 255 | 255 | | | | |
| ⋯ | | | | | | | | | | | | | | | | | | | | | |
| G399 | | | | | 255 | 255 | 255 | 0 | 0 | 0 | | 0 | 0 | 0 | 255 | 255 | 255 | | | | |
| G400 | | | | | 255 | 255 | 255 | 0 | 0 | 0 | | 0 | 0 | 0 | 255 | 255 | 255 | | | | |
| G401 | | | | | 255 | 255 | 255 | 255 | 255 | 255 | | 255 | 255 | 255 | 255 | 255 | 255 | | | | |
| G402 | | | | | 255 | 255 | 255 | 255 | 255 | 255 | | 255 | 255 | 255 | 255 | 255 | 255 | | | | |
| ⋯ | | | | | | | | | | | | | | | | | | | | | |
| G1920 | | | | | | | | | | | | | | | | | | | | | |

FIG. 6

| HIGH-ORDER 3 BITS | 8bit Min | 8bit Max | DECIMAL Min | DECIMAL Min |
|---|---|---|---|---|
| 111 | 11100000 | 11111111 | 224 | 255 |
| 110 | 11000000 | 11011111 | 192 | 223 |
| 101 | 10100000 | 10111111 | 160 | 191 |
| 100 | 10000000 | 10011111 | 128 | 159 |
| 011 | 01100000 | 01111111 | 96 | 127 |
| 010 | 01000000 | 01011111 | 64 | 95 |
| 001 | 00100000 | 00111111 | 32 | 63 |
| 000 | 00000000 | 00011111 | 0 | 31 |

FIG. 7

| HIGH-ORDER 3 BITS | DECIMAL NUMBER | Total |
|---|---|---|
| 111 | 7 | 22680 |
| 110 | 6 | 19440 |
| 101 | 5 | 16200 |
| 100 | 4 | 12960 |
| 011 | 3 | 9720 |
| 010 | 2 | 6480 |
| 001 | 1 | 3240 |
| 000 | 0 | 0 |

→

| Total | |
|---|---|
| 19440～22680 | RANK 7 |
| 16200～19439 | RANK 6 |
| 12960～16199 | RANK 5 |
| 9720～12959 | RANK 4 |
| 6480～9719 | RANK 3 |
| 3240～6479 | RANK 2 |
| 0～3239 | RANK 1 |

FIG. 8

| RANK DIFFERENCE | LARGE CORRECTION | MEDIUM CORRECTION | SMALL CORRECTION |
|---|---|---|---|
| 1 | 0. 05 | — | — |
| 2 | 0. 1 | 0. 05 | — |
| 3 | 0. 2 | 0. 1 | 0. 05 |
| 4 | 0. 3 | 0. 2 | 0. 1 |
| 5 | 0. 4 | 0. 3 | 0. 2 |
| 6 | 0. 5 | 0. 4 | 0. 3 |

FIG. 9

| | RANK | | | | | |
|---|---|---|---|---|---|---|
| | 7 | 6 | 5 | | 1 | 0 |
| RANK DIFFERENCE | AMOUNT OF CORRECTION | AMOUNT OF CORRECTION | AMOUNT OF CORRECTION | | AMOUNT OF CORRECTION | AMOUNT OF CORRECTION |
| −7 | | | | | | 0. 6 |
| −6 | | | | | 0. 4 | 0. 5 |
| −5 | | | | | 0. 32 | 0. 4 |
| −4 | | | | | 0. 24 | 0. 3 |
| −3 | | | | | 0. 16 | 0. 2 |
| −2 | | | 0. 06 | | 0. 08 | 0. 1 |
| −1 | | 0. 04 | 0. 03 | ...... | 0. 04 | 0. 05 |
| 0 | 0 | 0 | 0 | | 0 | 0 |
| 1 | −0. 05 | −0. 04 | −0. 03 | | −0. 04 | |
| 2 | −0. 1 | −0. 08 | −0. 06 | | | |
| 3 | −0. 2 | −0. 16 | −0. 12 | | | |
| 4 | −0. 3 | −0. 24 | −0. 18 | | | |
| 5 | −0. 4 | −0. 32 | −0. 24 | | | |
| 6 | −0. 5 | −0. 4 | | | | |
| 7 | −0. 6 | | | | | |

FIG. 11

| | RANK | | | | | |
|---|---|---|---|---|---|---|
| | 7 | | | 6 | | |
| RANK DIFFERENCE | AMOUNT OF CORRECTION n-TH ROW | AMOUNT OF CORRECTION n + 1-TH ROW | AMOUNT OF CORRECTION n + 2ND ROW | AMOUNT OF CORRECTION n-TH ROW | AMOUNT OF CORRECTION n + 1-TH ROW | AMOUNT OF CORRECTION n + 2ND ROW |
| −6 | | | | | | |
| −5 | | | | | | |
| −4 | | | | | | |
| −3 | | | | | | |
| −2 | | | | | | |
| −1 | | | | 0. 04 | 0 | 0 |
| 0 | 0 | 0 | 0 | 0 | 0 | 0 |
| 1 | −0. 05 | 0 | 0 | −0. 04 | 0 | 0 |
| 2 | −0. 1 | −0. 05 | 0 | −0. 08 | −0. 03 | 0 |
| 3 | −0. 2 | −0. 1 | −0. 05 | −0. 16 | −0. 06 | −0. 04 |
| 4 | −0. 3 | −0. 2 | −0. 1 | −0. 24 | −0. 16 | −0. 08 |
| 5 | −0. 4 | −0. 3 | −0. 2 | −0. 32 | −0. 24 | −0. 16 |
| 6 | −0. 5 | −0. 4 | −0. 3 | | | |

.....

FIG. 12

DISPLAY DEVICE AND DRIVING METHOD

TECHNICAL FIELD

The disclosure relates to a display device including pixel circuits and a driving method thereof.

BACKGROUND ART

In recent years, along with advances in Organic Light Emitting Diode (OLED) technology, products provided with organic Electro Luminescence (EL) display devices have become widespread. In general, a pixel in an organic EL display device is constituted by a light-emitting layer and a pixel circuit that supplies a current to the light-emitting layer, and the pixel circuit is provided with a thin film transistor (TFT). In such a display device, pixels are disposed in a matrix shape, and a light emission luminance in each of the pixels is controlled by the pixel circuit. Incidentally, in each of the pixels, a light emission luminance may be significantly different from that of normal pixels due to various factors. The presence of such pixels results in deterioration of image quality, and thus a technique for correcting light emission luminance has been proposed (see, for example, PTL 1).

CITATION LIST

Patent Literature

PTL 1: JP 2010-101926 A

SUMMARY OF INVENTION

Technical Problem

In the image display device disclosed in PTL 1, pixels are disposed in a matrix shape in a display unit, and a luminance adjustment unit corrects the luminance of abnormal light emitting pixels to make it difficult for abnormal light emission luminance to be visually recognized.

Incidentally, the deterioration of image quality in a display device is not limited to only a defect of a light-emitting layer, and also occurs due to a difference in brightness of a displayed image. In a configuration in which light and shade are adjusted in accordance with the magnitude of a data voltage which is input to each pixel, and a plurality of pixels are disposed adjacent to one other, when there is a significant difference in an input (voltage) between adjacent pixels, an input to one pixel may change an input to another pixel, which may cause an output different from an output which is inherently intended. For example, when a black region is provided in a white background, abnormal lines may be visually recognized near a boundary between the white background and the black region, and a line that is lighter than the white background, a line that is darker than the white background, or the like may be seen. In the above-described image display device, there is no consideration for a defect occurring due to a difference in an input.

The disclosure has been made to solve the above-described problems, and an object of the disclosure is to provide a display device and a driving method which are capable of alleviating luminance unevenness and stabilizing the quality of an image to be displayed.

Solution to Problem

A display device according to the disclosure is a display device including pixel circuits provided in a matrix shape in a display region; a scanning signal line, a data signal line, a first power supply voltage line, and a second power supply voltage line connected to the pixel circuits; a scanning signal line drive circuit configured to apply a voltage to the scanning signal line; a data signal line drive circuit configured to apply a voltage to the data signal line; and a display control unit configured to control the scanning signal line drive circuit and the data signal line drive circuit, in which the pixel circuits include a display element, a holding capacitor, and a drive transistor, and are configured such that a voltage of the data signal line corresponding to the scanning signal line selected is written in the holding capacitor as a data voltage when the scanning signal line is selected, the drive transistor includes a first conduction terminal connected to the first power supply voltage line, a second conduction terminal connected to the second power supply voltage line through the display element, and a control terminal connected to the first power supply voltage line through the holding capacitor, and the display control unit compares data values written in pixels in an n-th row corresponding to the selected scanning signal line with data values written in pixels in an (n−1)-th row being one row prior to the n-th row of the selected scanning signal line, and corrects the data voltage corresponding to the pixels in the n-th row in a case where a difference between the data values is equal to or greater than a threshold value.

The display device according to the disclosure may be configured such that the data values are gray scale data indicating a gray scale in each of the pixels.

The display device according to the disclosure may be configured such that the data values are values obtained by extracting a portion of the gray scale data indicating a gray scale in each of the pixels.

The display device according to the disclosure may be configured such that the gray scale data is formed by a plurality of bits, and a value of high-order bits is set to be the data value.

The display device according to the disclosure may be configured such that the display control unit extracts the high-order bits formed by a plurality of bits.

The display device according to the disclosure may be configured such that the display control unit includes a rank table in which the data values are classified into a plurality of ranks.

The display device according to the disclosure may be configured such that the display control unit includes a plurality of correction tables in which an amount of correction for the data voltage is set, and selects one of the plurality of correction tables based on the difference between the data values.

The display device according to the disclosure may be configured such that an amount of correction of a data voltage corresponding to the pixels of the n-th row and an amount of correction of a data voltage corresponding to the pixels of a row after the n-th row are set in the correction table.

The display device according to the disclosure may be configured such that the display control unit selects one of the plurality of correction tables based on the difference between the data values, selects a correction table in which a large amount of correction is set in a case where the difference between the data values is large, and selects a correction table in which a small amount of correction is set in a case where the difference between the data values is small.

The display device according to the disclosure may be configured such that, in the correction table, an amount of correction is set to be smaller for a second gray scale than for a first gray scale, the second gray scale having a smaller amount of light emission of the display element than that of the first gray scale having a larger amount of light emission of the display element.

The display device according to the disclosure may be configured such that the display control unit corrects the data voltage corresponding to the pixels in a row after the n-th row, based on results of the comparison between the data values in the (n−1)-th row and the data values in the n-th row.

The display device according to the disclosure may be configured such that the display control unit applies a smaller amount of correction to a row after the n-th row than an amount of correction applied to the n-th row.

The display device according to the disclosure may be configured such that the display control unit applies a smaller amount of correction to an (i+1)-th row than an amount of correction applied to an i-th row, the i th and (i+1)-th rows being rows after the n-th row.

The display device according to the disclosure may be configured such that the display control unit compares a sum of the data values written in the pixels in the n-th row and a sum of the data values written in the pixels in the (n−1)-th row.

The display device according to the disclosure may be configured such that the pixels include a first pixel configured to emit light of a first color, a second pixel configured to emit light of a second color, and a third pixel configured to emit light of a third color, and the display control unit compares sums of data values in the first pixel.

The display device according to the disclosure may be configured such that the first color is green.

The display device according to the disclosure may be configured such that the pixels include a first pixel configured to emit light of a first color, a second pixel configured to emit light of a second color, and a third pixel configured to emit light of a third color, and the display control unit selects a correction table in which an amount of correction for the data voltage is set, based on a result obtained by comparing sums of data values in the first pixel and determining whether the sums are equal to or greater than a first threshold value, a result obtained by comparing sums of data values in the second pixel and determining whether the sums are equal to or greater than a second threshold value, and a result obtained by comparing sums of data values in the third pixel and determining whether the sums are equal to or greater than a third threshold value.

The display device according to the disclosure may be configured such that the display control unit compares data values between pixels on the same data signal line when comparing the data values in the (n−1)-th row and the data values in the n-th row.

The display device according to the disclosure may be configured such that the pixels include a first pixel configured to emit light of a first color, a second pixel configured to emit light of a second color, and a third pixel configured to emit light of a third color, and the display control unit compares data values between pixels of the same color on the same data signal line.

The display device according to the disclosure may be configured such that the pixels of the same color are green pixels.

The display device according to the disclosure may be configured such that the display control unit corrects the data voltage in pixels around a solid image when displaying the solid image in which all pixels within a predetermined range have the same data value.

The display device according to the disclosure may be configured such that the solid image has a luminance lower than that of surrounding pixels.

The display device according to the disclosure may be configured such that the solid image has a luminance higher than that of surrounding pixels.

A driving method for a display device according to the disclosure is a driving method for a display device including pixel circuits provided in a matrix shape in a display region, a scanning signal line, a data signal line, a first power supply voltage line, and a second power supply voltage line connected to the pixel circuits, a scanning signal line drive circuit configured to apply a voltage to the scanning signal line, a data signal line drive circuit configured to apply a voltage to the data signal line, and a display control unit configured to control the scanning signal line drive circuit and the data signal line drive circuit, the pixel circuits including a display element, a holding capacitor, and a drive transistor and being configured such that a voltage of the data signal line corresponding to the scanning signal line selected is written in the holding capacitor as a data voltage when the scanning signal line is selected, the drive transistor including a first conduction terminal connected to the first power supply voltage line, a second conduction terminal connected to the second power supply voltage line through the display element, and a control terminal connected to the first power supply voltage line through the holding capacitor, the driving method including causing the display control unit to compare data values written in pixels in an n-th row corresponding to the selected scanning signal line with data values written in pixels in an (n−1)-th row being one row prior to the n-th row of the selected scanning signal line, and to correct the data voltage corresponding to the pixel in the n-th row in a case where a difference between the data values is equal to or greater than a threshold value.

Advantageous Effects of Disclosure

According to the disclosure, a data voltage is corrected based on results of comparison between data values, and thus it is possible to alleviate luminance unevenness caused by a difference between the data values and stabilize the quality of an image to be displayed.

BRIEF DESCRIPTION OF DRAWINGS

FIG. 6 is a diagram illustrating an example of gray scale data.

FIG. 7 is a correspondence table showing binary numbers and decimal numbers in values of gray scale data.

FIG. 8 is a correspondence table showing a relationship between the sum of data values and ranks.

FIG. 9 is a table illustrating an example of a correction table showing a relationship between a rank difference and the amount of correction.

FIG. 11 is a table illustrating an example of a correction table showing a relationship between a rank difference and the amount of correction.

FIG. 12 is a table illustrating an example of a correction table showing a relationship between a rank difference and the amount of correction.

DESCRIPTION OF EMBODIMENTS

The term "connection" in the present description means "electrical connection" unless otherwise specified, and in the scope without departing from the subject matters of the disclosure, it includes not only a case to mean direct connection, but also a case to mean indirect connection through other elements.

First Embodiment

With reference to the drawings, a display device according to a first embodiment of the disclosure will be described below.

Figure 1:
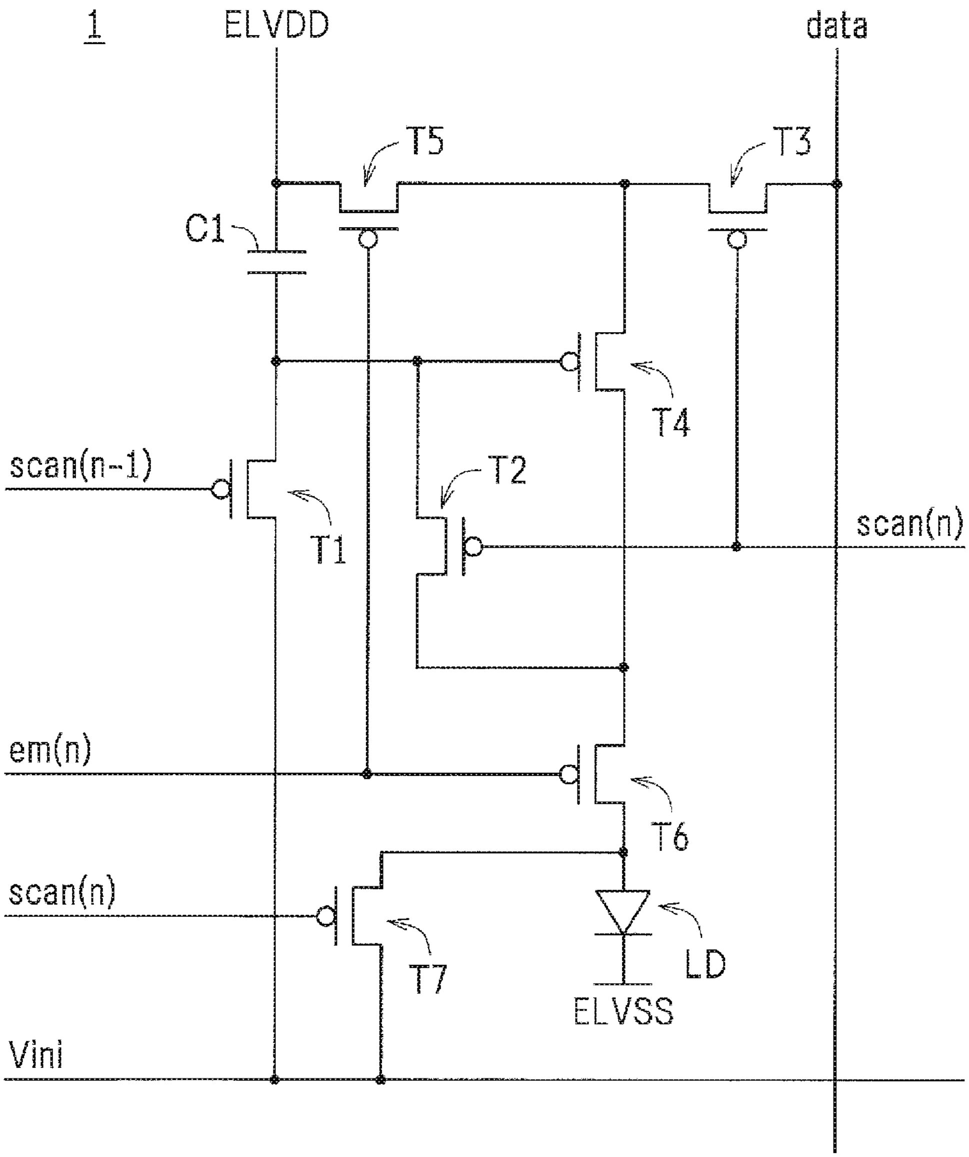
FIG. 1 is an equivalent circuit diagram illustrating a pixel circuit of a display device.

FIG. 1 is an equivalent circuit diagram illustrating a pixel circuit of a display device.

A display device 10 (see FIG. 2) includes a display region HR constituted by a plurality of pixels arrayed in a matrix shape. The plurality of pixels typically includes green pixels (first pixels) that display green (an example of a first color), red pixels (second pixels) that display red (an example of a second color), and blue pixels (third pixels) that display blue (an example of a third color). Each of the pixels is provided with a corresponding display element LD and is controlled by a corresponding pixel circuit 1.

A straight line corresponding to "Scan (n)" and "Scan (n−1)" indicates a scanning signal line, a straight line corresponding to "data" indicates a data signal line, and a straight line corresponding to "em (n)" indicates a light emission control line. In addition, "ELVDD" indicates a high power supply voltage, and a straight line connected thereto is equivalent to a high power supply voltage line (first power supply voltage line). Further, "ELVSS" indicates a low power supply voltage, and a straight line connected thereto is equivalent to a low power supply voltage line (second power supply voltage line). In addition, a straight line corresponding to "Vini" indicates an initialization wiring line corresponding to a reset potential.

In the present embodiment, 4.6 V is applied to the high power supply voltage line, and −4.4 V is applied to the low power supply voltage line. A voltage of 2 to 7 V is applied to the data signal line. A voltage of −4 V is applied to the initialization wiring line. To the scanning signal line and the light emission control line, a voltage of 7 V is applied in a state of being "High", and a voltage of 2 V is applied in a state of being "Low".

Note that the values of voltages applied to the above-described various wiring lines are merely examples, and may be adjusted to optimal values in accordance with various designs such as the configuration of the display device 10 and the size of the display region HR.

FIG. 1 illustrates an example of the pixel circuit 1, and is configured by combining seven transistors (a first circuit transistor T1 to a seventh circuit transistor T7), a capacitor C1 (holding capacitor), and a display element LD.

In the pixel circuit 1, the first circuit transistor T1 to the third circuit transistor T3, and the fifth circuit transistor T5 to the seventh circuit transistor T7 are used as switching transistors. In addition, the fourth circuit transistor T4 is configured as a drive transistor that supplies power to the display element LD.

The first circuit transistor T1 is configured as a first initialization transistor, and is configured such that one end thereof is connected to a gate electrode (control terminal) of a drive transistor (the fourth circuit transistor T4), and the other end thereof is connected to the initialization wiring line. In addition, the seventh circuit transistor T7 is configured as a second initialization transistor, and is configured such that one end thereof is connected to an anode of the display element LD, and the other end thereof is connected to the initialization wiring line.

Among scanning signal lines, "Scan (n−1)" is connected to the gate electrode of the first circuit transistor T1, and "Scan (n)" is connected to the gate electrode of the seventh circuit transistor T7. The first circuit transistor T1 and the seventh circuit transistor T7 are connected to different scanning signal lines, and different voltages may be applied thereto.

In the fourth circuit transistor T4, a first conduction terminal (the upper side in FIG. 1) is connected to a high power supply voltage line through the fifth circuit transistor T5, and a second conduction terminal (the lower side in FIG. 1) is connected to a low power supply voltage line through the sixth circuit transistor T6 and the display element LD. Further, in the fourth circuit transistor T4, a control terminal (the left side in FIG. 1) is connected to a high power supply voltage line through the capacitor C1. Further, in the fourth circuit transistor T4, the first conduction terminal is connected to a data signal line through the third circuit transistor T3. Further, in the fourth circuit transistor T4, the control terminal and the second conduction terminal are connected through the second circuit transistor T2.

Among scanning signal lines, "Scan (n)" is connected to gate electrodes of the second circuit transistor T2 and the third circuit transistor T3. A light emission control line is connected to gate electrodes of the fifth circuit transistor T5 and the sixth circuit transistor T6.

In the pixel circuit 1, a potential difference between a voltage applied to a data signal line (data voltage) and a voltage applied to a high power supply voltage line is held in the holding capacitor. In addition, the amount of current of the drive transistor is controlled by the potential difference held in the holding capacitor. For example, when a voltage in the high power supply voltage line increases, a voltage held in the holding capacitor decreases, and a current flowing through the display element LD increases, which results in an increase in brightness.

Figure 2:
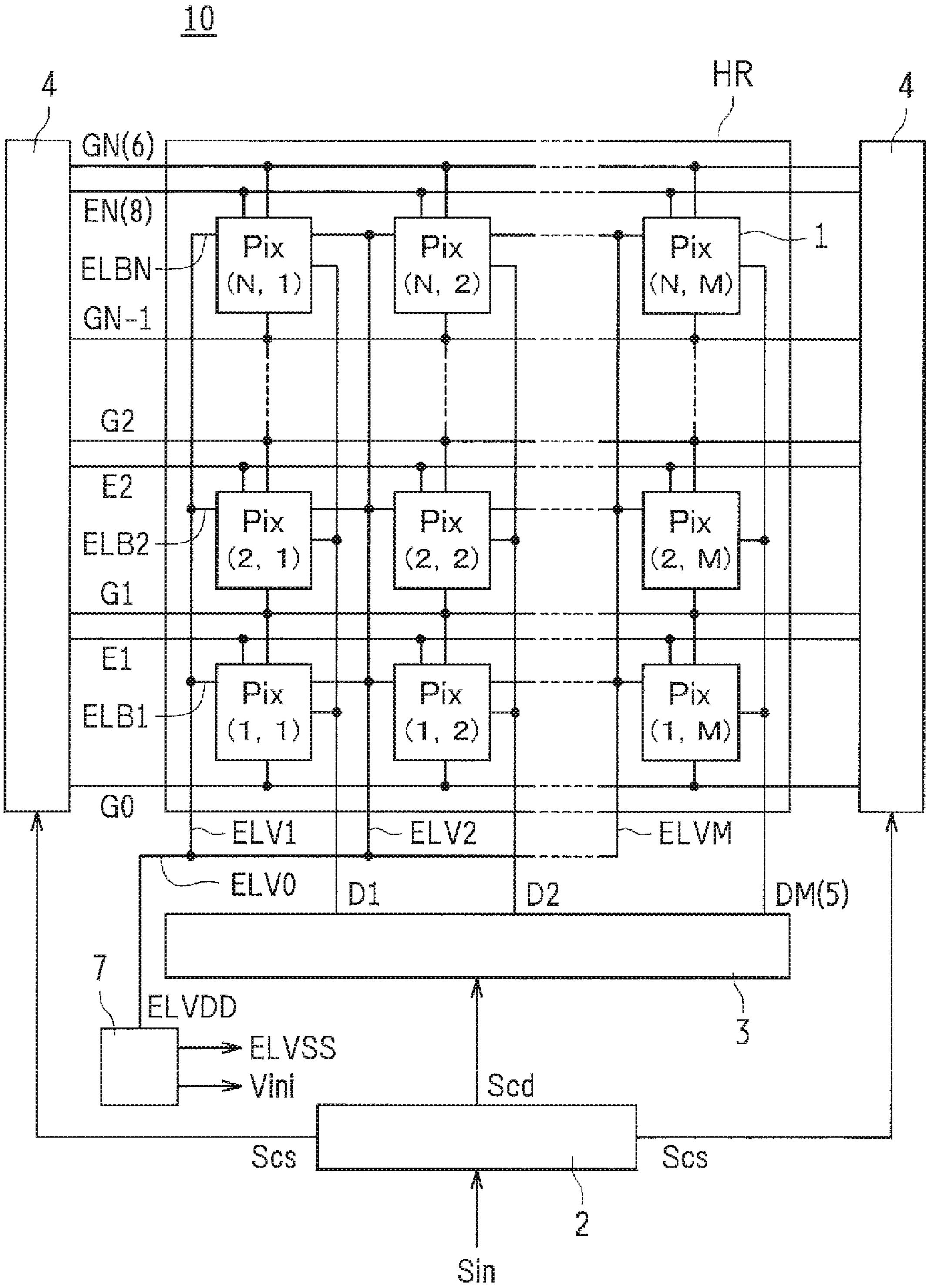
FIG. 2 is a schematic configuration diagram illustrating a schematic configuration of the display device.

FIG. 2 is a schematic configuration diagram illustrating a schematic configuration of the display device.

The display device 10 controls a voltage to be applied to a data signal line 5 and a scanning signal line 6 from a data signal line drive circuit 3 and a scanning signal line drive circuit 4 by the display control unit 2. Note that FIG. 2 illustrates a plurality of the scanning signal line drive circuits 4 respectively positioned at two locations facing each other with a display region HR interposed therebetween. However, no such limitation is intended, and the scanning signal line drive circuit 4 may be provided on only one side of the display region HR. In addition, the data signal line drive circuit 3 is disposed along one side of the display region HR. However, no such limitation is intended, and a plurality of the data signal line drive circuits 3 may be respectively provided at two locations facing each other with the display region HR interposed therebetween, similar to the scanning signal line drive circuit 4.

In the display region HR, the pixel circuits 1 illustrated in FIG. 1 are disposed in a matrix shape. In FIG. 2, in order to distinguish the plurality of pixel circuits 1 while omitting some pixel circuits 1, the pixel circuit 1 positioned on the lower left side is assumed to be a pixel circuit in a first line and a first column, and the N×M pixel circuits 1 are denoted by "Pix (1,1)" to "Pix(N,M)" in the display region HR. However, no such limitation is intended, and a direction in which the order of arrangement of the pixel circuits 1 and the like in the display region HR is counted is only required to be appropriately adjusted.

The display control unit 2 outputs a signal "Scd" applied to the data signal line drive circuit 3 and a signal "Scs" applied to the scanning signal line drive circuit 4 in accordance with an input signal "Sin". In the display region HR, an image GZ and the like are displayed by controlling the luminance of each pixel by input signals applied from the data signal line 5 and the scanning signal line 6 that extend in a matrix shape.

In FIG. 2, in order to distinguish the plurality of data signal lines 5, the data signal lines 5 are denoted by "D1" to "DM", and the plurality of scanning signal lines 6 are denoted by "G0" to "GN". The plurality of data signal lines 5 extend along the pixel circuits 1 that are aligned in the vertical direction in the display region HR, and the plurality of scanning signal lines 6 extend along the pixel circuits 1 that are aligned in the horizontal direction in the display region HR.

In addition, a plurality of light emission control lines 8 extend from the scanning signal line drive circuit 4, and the light emission control lines 8 are denoted by "E1" to "EN" in order to distinguish them. The plurality of light emission control lines 8 extend along the pixel circuits 1 that are aligned in the horizontal direction in the display region HR, similar to the scanning signal lines 6.

The display device 10 further includes a power supply circuit 7, and a high power supply voltage line, a low power supply voltage line, and an initialization wiring line are connected to the power supply circuit 7. The high power supply voltage line includes a main wiring line connected directly to the power supply circuit 7, trunk wiring lines branching from the main wiring line, and branch wiring lines branching from the trunk wiring lines. In FIG. 2, in order to distinguish the main wiring line, the trunk wiring lines, and the branch wiring lines in the high power supply voltage line, the main wiring line is denoted by "ELV0", the trunk wiring lines are denoted by "ELV1" to "ELVM", and the branch wiring lines are denoted by "ELB1" to "ELBN".

The main wiring line is in a region outside the display region HR, and extends in the horizontal direction along an outer edge of the display region HR. Note that, in FIG. 2, the main wiring line is disposed outside the display region HR. However, no such limitation is intended, and the main wiring line may be disposed in the display region HR.

The plurality of trunk wiring lines are provided so as to branch from the main wiring line, and extend along the pixel circuits 1 that are aligned in the vertical direction in the display region HR. The plurality of branch wiring lines are provided so as to branch from one (ELV1 in FIG. 2) of the trunk wiring lines, and extend to pass through the pixel circuits 1 that are aligned in the horizontal direction in the display region HR.

FIG. 2 illustrates some of the low power supply voltage lines and the initialization wiring lines extending from the power supply circuit 7 in consideration of the ease of viewing of the drawings, but the low power supply voltage lines and the initialization wiring lines may be connected to the pixel circuits 1 in the display region HR similar to the high power supply voltage line.

Parasitic capacitance is generated between the data signal line and the high power supply voltage line described above, and a data voltage affects a voltage of the high power supply voltage line. Such a phenomenon is not limited to only the data signal line, and is also likely to occur in other portions such as between the initialization wiring line and the data signal line and between the initialization wiring line and the high power supply voltage line. Next, the influence of the displacement of a voltage on the display of an image will be described with reference to FIGS. 3 and 4.

Figure 3:
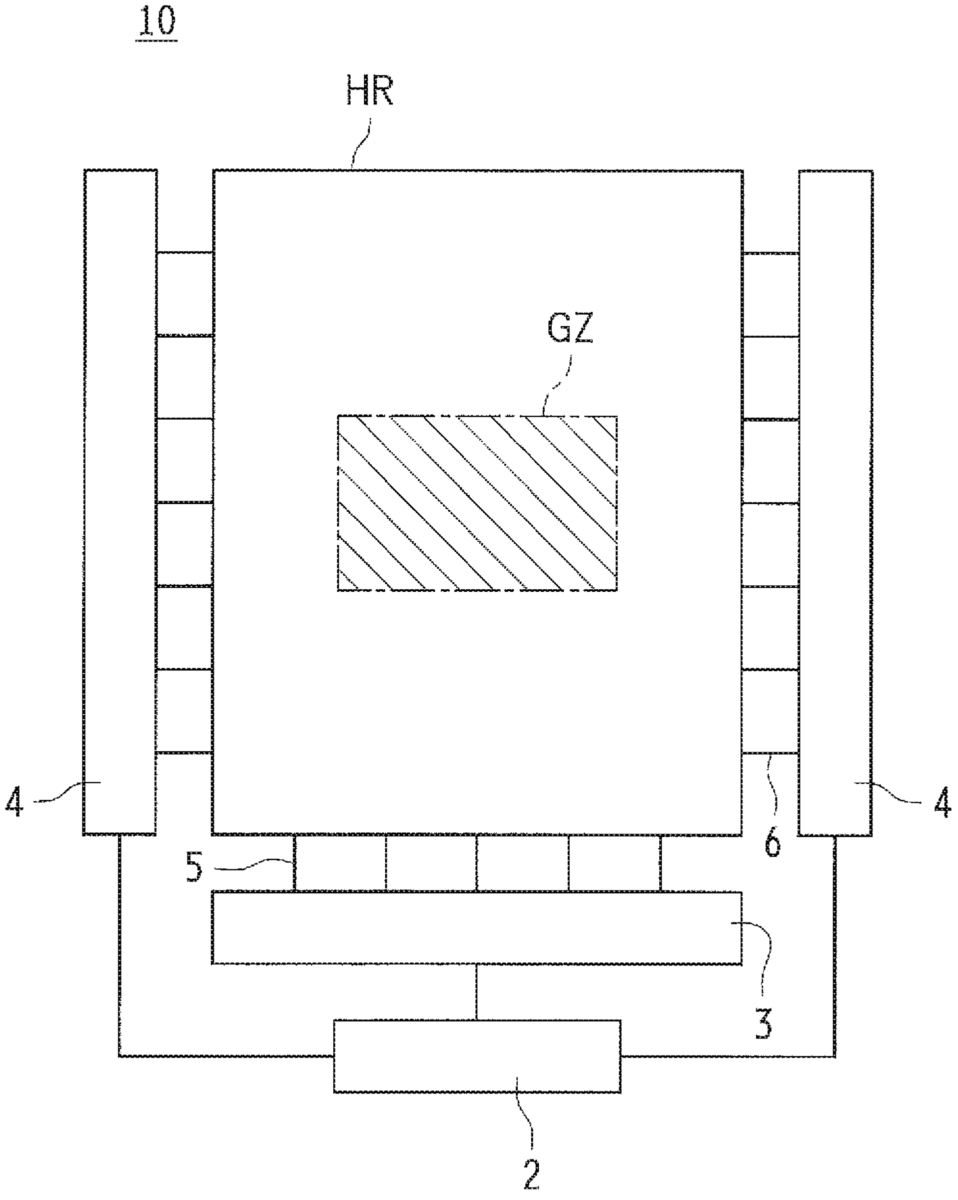
FIG. 3 is a schematic diagram illustrating a display device on which an image is displayed.
Figure 4:
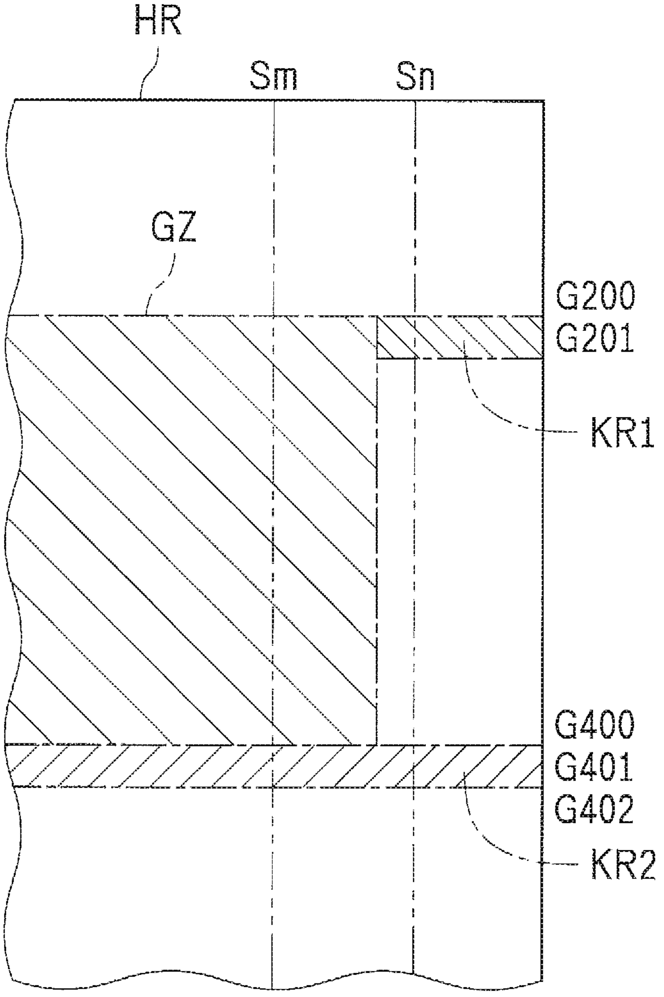
FIG. 4 is an enlarged diagram illustrating a portion of a display region in FIG. 3.

FIG. 3 is a schematic diagram illustrating the display device on which an image is displayed, and FIG. 4 is an enlarged diagram illustrating a portion of the display region in FIG. 3. Note that, in FIGS. 3 and 4, an image GZ, a first interference region KR1, and a second interference region KR2 are hatched in order to emphasize them, but it is not related to the color and luminance actually displayed.

In the present embodiment, in the display region HR, the scanning signal lines extend in the horizontal direction, and the data signal lines extend in the vertical direction. That is, in a matrix corresponding to the display region HR, the scanning signal line corresponds to a row, and the data signal line corresponds to a column. "Gxxx" illustrated in FIG. 4 indicates in which row from the top the scanning signal line is located in the display region HR among the scanning signal lines, and for example, "G200" is equivalent to a scanning signal line in a 200th row.

In FIG. 4, a portion of the rectangular image GZ is displayed in the display region HR in an enlarged manner, as illustrated in FIG. 3. The image GZ is located substantially in the center of the display region HR and is colored in black, and the gray scale of the pixel is dark. Further, in the display region HR, a portion other than the image GZ is colored in white, and the gray scale of the pixel is bright. That is, the black rectangle image GZ is displayed in the center of the display region HR which is a white background.

Specifically, the image GZ occupies a region from a 201st row (G201) to a 400th row (G400) in the row direction (horizontal direction). Note that, although it will be described later in detail in FIG. 6, the position of the image GZ in the column direction (vertical direction) occupies a region from a 201st column (201RGB) to a 500th column (500RGB), and a white background is provided between the image and the outer periphery. In FIG. 4, two straight lines extending in the vertical direction indicate some of the plurality of data signal lines, "Sm" corresponds to a data signal line passing through the white background and the image GZ, and "Sn" is a region outside the image GZ and corresponds to a data signal line passing through only the white background.

In general, in the display device 10, voltages applied to various wiring lines of the pixel circuit 1 may interfere with adjacent pixel circuits 1 and other wiring lines, and this effect is noticeable at a location where a difference in gray scale is large. Specifically, in the case of FIG. 4, a line which is brighter than the surrounding white background is seen in a first interference region KR1 between an end of the image GZ and the outer periphery thereof in the 201st row (G201). Further, in a 401st row (second interference region KR2) positioned below the image GZ, a line which is slightly darker than the surrounding white background is seen. Consequently, signals (voltages) that are input to various wiring lines will be described with reference to the drawings.

Figure 5:
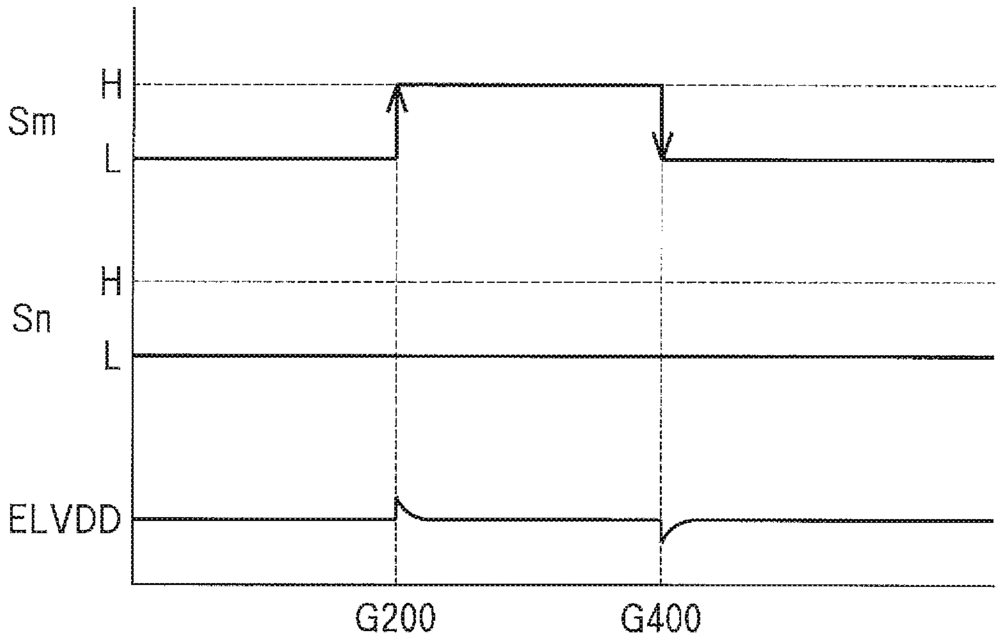
FIG. 5 is a diagram illustrating signals (voltages) input to various wiring lines.

FIG. 5 is a diagram illustrating signals (voltages) that are input to various wiring lines.

FIG. 5 illustrate a voltage applied to the data signal line of "Sm", a voltage applied to the data signal line of "Sn", and a voltage of the first power supply voltage line (ELVDD). In FIG. 5, the horizontal axis indicates to which row in the display region HR a data signal line corresponds, and a downward advance in the display region HR is shown as it moves to the right. The vertical axis indicates a magnitude at each voltage, and the value thereof increases as it moves upward.

For "Sm", a predetermined range is set, and a range of 2 to 7 V is set in the present embodiment. In FIG. 5, a low voltage is represented as L (Low), a high voltage is represented as H (High), and in the display region HR, a lower voltage is displayed in white (with a higher luminance), and a higher voltage is displayed in black (with a lower luminance). Note that no such limitation is intended, and a higher voltage may be displayed in white (with a higher luminance), and a lower voltage may be displayed in black (with a lower luminance). In addition, it may be appropriately selected whether to apply a P type or an N type to the drive transistor depending on a relationship between a voltage and a luminance.

In "Sm", "L" is set from a first row (a left end in FIG. 5) to the 200th row, "H" is set from the 201st row to the 400th row, and "L" is set for rows after the 401st row. That is, a voltage in a period corresponding to the image GZ illustrated in FIG. 4 is displayed in black as "H". In "Sn", "L" is set from the first to the last. Note that a voltage applied to a data signal line is not limited to only a minimum value and a maximum value and is only required to be appropriately changed between "L" and "H" in accordance with a luminance.

As described above, parasitic capacitance is generated between a data signal line and a high power supply voltage line, and variations in voltage are temporarily stored in the parasitic capacitance, which may change "ELVDD". Regarding "ELVDD", a voltage is originally set to be constant. Incidentally, in "Sm", a voltage changes rapidly around the 200th row and around the 400th row, and "ELVDD" fluctuates due to the effect. Specifically, "ELVDD" temporarily rises around the 200th row and temporarily drops around the 400th row.

As described above, in the display device 10, the luminance of the pixel is determined by the potential difference held in the holding capacitor. For this reason, even when "Sn" is constant, "ELVDD" fluctuates, and thus a potential difference held in the holding capacitor deviates from an intended value, resulting in luminance unevenness.

In the high power supply voltage line, the plurality of trunk wiring lines which branch from the main wiring line are provided, and sudden changes in voltage which occur in the trunk wiring lines also affects the trunk wiring lines through the main wiring line. Further, the branch wiring lines which branch from the trunk wiring lines are also provided, and sudden changes in voltage may affect the trunk wiring lines through the branch wiring lines. In the pixel circuits aligned in the row direction, luminance unevenness may occur due to the influence of an ON potential which is input to the scanning signal line.

On the other hand, in the display device 10 according to the present embodiment, a data voltage is corrected for a location where a shade different from a shade which is originally intended is displayed, thereby eliminating luminance unevenness. Next, in the display device 10 according to the present embodiment, a driving method for correcting a voltage will be described.

FIG. 6 is a diagram illustrating an example of gray scale data.

When the image GZ is displayed in the display region HR, the display control unit 2 controls a voltage to be applied to each pixel based on the gray scale data. FIG. 6 illustrates gray scale data corresponding to the state illustrated in FIG. 3 as an example. Note that, in FIG. 6, in order to emphasize a portion corresponding to the image GZ, the vicinity of a boundary between the image GZ and a background is extracted and illustrated, and illustration and values of gray scale data for the other portions are omitted.

In the present embodiment, the display region HR is constituted by pixels of 1920 rows×3240 columns. In addition, one pixel unit is constituted by one row and three columns and includes three pixels. In the display region HR, a column of red pixels, a column of green pixels, and a column of blue pixels are repeatedly aligned in order from the left. For example, a pixel unit of one row (G1) by one column (1RGB) is constituted by a red pixel "S1", a green pixel "S2", and a blue pixel "S3". In the pixel unit, various colors can be expressed by changing a ratio between the luminance of the red pixel, the luminance of the green pixel, and the luminance of the blue pixel. When pixels of three rows are converted into one pixel unit, the display region HR includes pixel units of 1920 rows×1080 columns. Note that, for the following description, a column in a pixel unit (for example, 501RGB or the like) will be referred to simply as a column and may be distinguished from a column in a pixel (for example, S1501 or the like).

Gray scale data corresponding to a pixel is indicated by a value between 0 and 255. A brightness decreases (a luminance decreases) as the value becomes smaller, and a brightness increases (a luminance increases) as the value becomes larger. For example, in FIG. 6, in a pixel unit of a 200th row (G200) and a 500th column (500RGB) corresponding to a white background, the value of gray scale data is set to 255 in all of a red pixel (S1498), a green pixel (S1499), and a blue pixel (S1500). Further, in FIG. 6, in a pixel unit of a 201st row (G201) corresponding to the image GZ (black rectangle) of a 500th column (500RGB), the value of gray scale data is set to 0 in all of a red pixel (S1498), a green pixel (S1499), and a blue pixel (S1500).

FIG. 7 is a correspondence table showing binary numbers and decimal numbers in values of gray scale data.

In the display device 10, gray scale data has a value of a binary number of 8 bits. The display control unit 2 is used in the following processing by using a value of high-order 3 bits in gray scale data of 8 bits as a data value. As illustrated in FIG. 6, in a case where the value of high-order 3 bits is "111", a minimum value in 8 bits is "11100000", and a maximum value is "11111111". When the value is converted into a decimal number, a minimum value is "224", and a maximum value is "255". Values between 0 and 255 illustrated in FIG. 6 can be converted into binary numbers as illustrated in FIG. 7.

FIG. 8 is a correspondence table showing a relationship between the sum of data values and ranks.

In the present embodiment, the sum of data values is calculated and classified as a corresponding rank. Specifically, based on FIG. 7, the value of high-order 3 bits extracted from gray scale data of 8 bits includes eight values of "000", "001", "010", "011", "100", "101", "110", and "111". When the values of high-order 3 bits are converted into decimal numbers, "0" to "7" are obtained. The display control unit 2 calculates the sum of data values by adding up the values (decimal numbers) of high-order 3 bits in the respective pixels in all rows. For example, in a case where the values of high-order 3 bits in the decimal numbers in any one row are all "1", a total value from a 1st column (S1) to a 3240th column (S3240) in the pixel is 3240. Further, in a case where the values of high-order 3 bits in the entire one row are all "7", a total value is 22680.

In a rank table illustrated in FIG. 8, a case where a total value is "0 to 3239" is assumed to be a rank 1, a case where a total value is "3240 to 6479" is assumed to be a rank 2, a case where a total value is "6480 to 9719" is assumed to be a rank 3, a case where a total value is "9720 to 12959" is assumed to be a rank 4, a case where a total value is "12960 to 16199" is assumed to be a rank 5, a case where a total value is "16200 to 19439" is assumed to be a rank 6, and a case where a total value is "19440 to 22680" is assumed to be a rank 7. In this manner, it is possible to simplify comparison between data values by setting ranks in which data values in predetermined ranges are collected.

In the present embodiment, the ranks 1 to 7 are classified so as to have equal ranges. However, no such limitation is intended, and a deviation may be provided in the range of any one rank by expanding the range of the rank, or the like.

FIG. 9 is a table illustrating an example of a correction table showing a relationship between a rank difference and the amount of correction.

In the present embodiment, the amount of correction for a data voltage is determined based on a rank corresponding to a data value. Here, the amount of correction is determined with reference to the correction table. The display control unit 2 compares a rank corresponding to any one selected row (n-th row) and a rank corresponding to a row (n−1-th row) one row prior to the selected row in a scanning signal line to calculate a rank difference. That is, by comparing total values in one line, correction based on a difference in a total luminance between lines can be performed.

FIG. 9 illustrates an example of a correction table and illustrates the amount of correction corresponding to a rank difference. For the amount of correction, three stages are set, and a large amount of correction of "large correction", a medium amount of correction of "medium correction", and a small amount of correction of "small correction" are provided. In the correction table illustrated in FIG. 9, the smaller the rank difference, the smaller the amount of correction is set. Specific processing will be described along with a processing flow to be described below. In addition, the correction table is not limited to the example illustrated in FIG. 9. In addition, a plurality of correction tables may be provided, and the display control unit 2 is only required to appropriately select a correction table suitable for conditions from among the plurality of correction tables. Note that the unit of the amount of correction illustrated in FIG. 9 is "V".

In the present embodiment, the value of a voltage is set as the amount of correction. However, no such limitation is intended, and values represented in other forms such as a code value (digital value) may be used as the amount of correction. For example, when a code value represented by one or a plurality of bits is set as the amount of correction, the value may be converted into a voltage in any one process regardless of before or after correction, and a final output voltage is only required to be ascertained.

Figure 10:
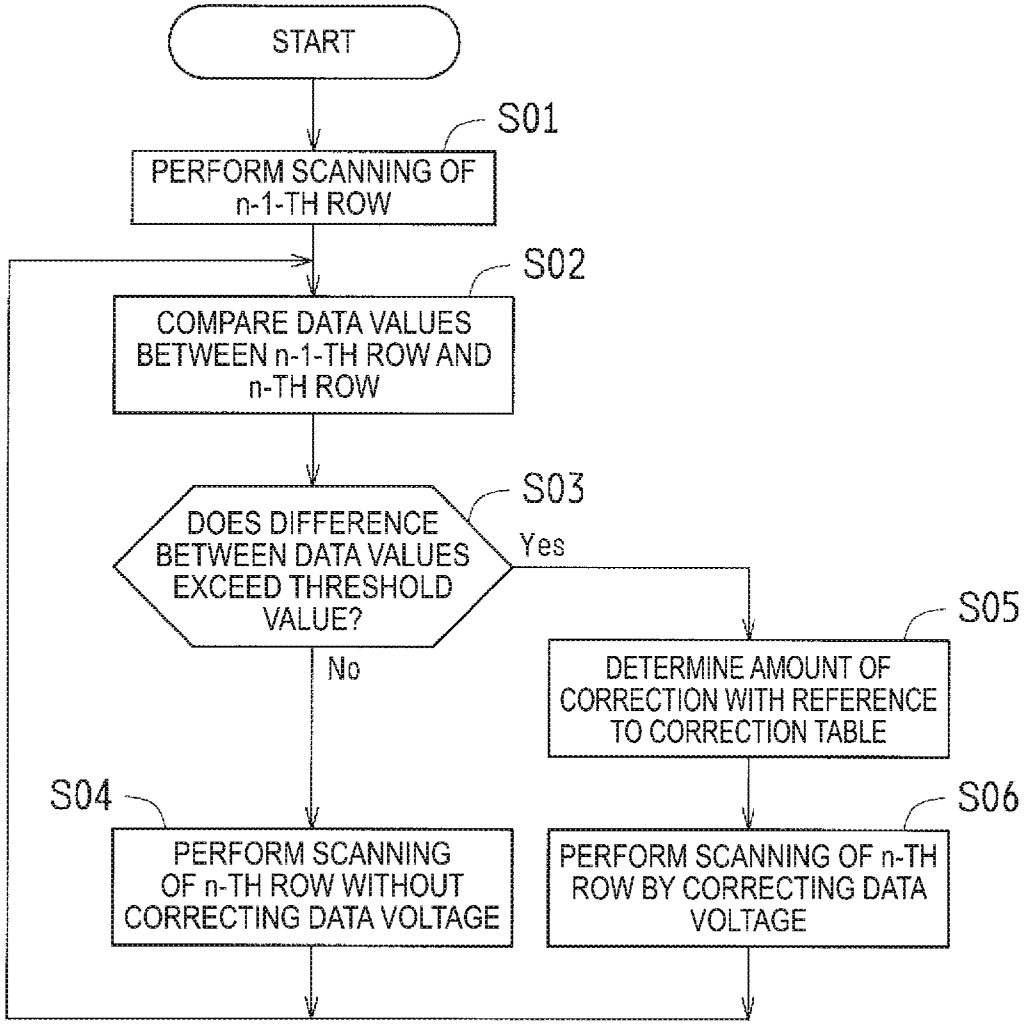
FIG. 10 is a processing flowchart illustrating a driving method including correction of data voltages in the display device.

FIG. 10 is a processing flowchart illustrating a driving method including the correction of a data voltage in the display device.

In step S01, the display control unit 2 performs scanning of any one selected row (n-th row) in a scanning signal line. Note that, here, the scanning is performed in response to only an instruction given to the data signal line drive circuit 3, and a timing at which a voltage is actually applied may be appropriately adjusted.

In step S02, the display control unit 2 compares data values in the n−1-th row and the n-th row. In the first embodiment, the sums of data values for each row are compared with each other. However, no such limitation is intended, and a target to be compared may be changed as in a second embodiment and a third embodiment to be described below.

In step S03, the display control unit 2 determines whether a difference between data values exceeds a threshold value. For example, in a case where ranks corresponding to rows are compared with each other as in the first embodiment, it is determined that a difference between data values exceeds a threshold value when the ranks are different from each other. As a result, in a case where the difference between the data values exceeds the threshold value (step S03: Yes), the processing proceeds to step S05. On the other hand, in a case where the difference between the data values does not exceed the threshold value (step S03: No), the processing proceeds to step S04.

In step S04, the display control unit 2 performs scanning of the n-th row without correcting a data voltage. Thereafter, the processing returns to step S02 and is repeated. Note that, when the processing is repeated, rows are only required to be sequentially shifted by performing addition to the value of n, or the like.

In step S05, the display control unit 2 corrects the amount of correction with reference to the correction table.

In step S06, the display control unit 2 corrects a data voltage to perform scanning of an n-th row. Thereafter, the processing returns to step S02 and is repeated. Note that, when the processing is repeated, rows are only required to be sequentially shifted by performing addition to the value of n, or the like.

Next, processing performed by the display control unit 2 will be described using a case where the image GZ as illustrated in FIG. 4 is displayed as an example. For example, the above-mentioned rank difference occurs in a portion in which a row which is bright as a whole switches to a row including a dark portion, as in the 200-th row (G200) and the 201st row (G201). Hereinafter, description will be given on the assumption that the 200th row corresponds to a rank 7, the 201st row corresponds to a rank 4, and a rank difference therebetween is "3". Since the rank difference occurs, a data voltage applied to a pixel unit of the 201st row and a 501st column (G200, 501RGB) corresponding to the first interference region KR1 is corrected. Referring to the correction table illustrated in FIG. 9, the amount of correction in the large correction having a rank difference of "3" is "0.2", and thus a data voltage is corrected to 2.2 V by adding the amount of correction to 2 V which is to be originally applied.

The correction described above is not limited to only one pixel unit, and the entire row may be corrected. That is, the amount of correction having a rank difference of "3" may be added to the entire 201st row.

Incidentally, for a 202nd row and a 203rd row, there is no rank difference only by comparing ranks with the upper rows (the 201st row and the 202nd row), and thus it is determined that correction is not necessary. However, "ELVDD" may not fluctuate only in one row, and luminance unevenness may occur in the 202nd row or the 203rd row. Consequently, a row to be corrected is not limited to only one row, and correction may also be performed on the following row (subsequent row). In this manner, in a case where correction is performed over a plurality of rows, the amount of correction may be gradually reduced. For example, "0.1" which is the amount of correction in the medium correction may be applied to the 202nd row which is next to the corrected row, and "0.05" which is the amount of correction in the small correction may be applied to the 203rd row which is next to the 202nd row. Note that, in FIG. 9, a rank difference is shown as a correction table in which a plurality of amounts of correction are set, but no such limitation is intended. A plurality of correction tables in which rank differences and amounts of correction are associated with each other on a one-to-one basis may be provided, and a different correction table may be selected for a subsequent row. When the plurality of correction tables are provided, the order in which the correction tables are selected may be set, and a correction table to be applied to the subsequent row may be determined in accordance with the order.

Next, a portion in which a row including a dark portion switches to a row which is bright as a whole will be described as in the 400th row (G400) and the 401st row (G401). Hereinafter, description will be given on the assumption that the 400th row corresponds to a rank 4, the 401st row corresponds to a rank 7, and a rank difference therebetween is "3". The 401st row corresponding to a second interference region KR2 will be darker than the original display without correction. Consequently, a data voltage is corrected to 1.8 V by adding "0.2" which is the amount of correction to 2 V which is to be originally applied.

In addition, a different correction table may be selected depending on a voltage to be originally applied. Here, in the correction table, the amount of correction is different between a first gray scale having a large amount of light emission (high luminance) of the display element and a second gray scale having the amount of light emission (low luminance) smaller than the first gray scale, and a small amount of correction is set for the second gray scale. For example, when a voltage to be originally applied is 4.5 V, a correction table in which the amount of correction of "0.1" is set for a rank difference of "3" is selected. In this manner, luminance unevenness is not noticeable in a dark gray scale, and thus changes in the visual appearance due to correction are suppressed by reducing the amount of correction.

As described above, in the present embodiment, a data voltage is corrected based on results of comparison between data values, and thus it is possible to stabilize the quality of an image to be displayed by alleviating luminance unevenness caused by a difference between the data values.

In addition, it is possible to determine a change in luminance by comparing gray scale data corresponding to pixels. At this time, it is possible to appropriately set a comparison range by extracting a plurality of bits as high-order bits. In this manner, it is possible to cope with a large fluctuation in gray scale by using high-order bits corresponding to a large value. Note that, in the present embodiment, comparison using high-order 3 bits among gray scale data of a binary number of 8 bits has been performed. However, no such limitation is intended, and comparison between data values may be performed using gray scale data of a binary number of 8 bits itself.

As described above, the display control unit 2 includes a plurality of correction tables in which the amount of correction is set for a data voltage, and is configured to select one of the plurality of correction tables based on a difference between data values. That is, it is possible to set an appropriate amount of correction of a data voltage by selecting a correction table in accordance with the difference between the data values.

In addition, the display control unit 2 is configured to select a correction table in which a large amount of correction is set in a case where a difference between the data values is large, and to select a correction table in which a small amount of correction is set in a case where a difference between the data values is small. In this manner, it is possible to adjust the degree of correction by selecting a correction table having different amounts of correction in accordance with the magnitude of a difference between the data values.

As for the elimination of luminance unevenness, a case where a black solid image is displayed in a white background is illustrated as an example in FIG. 3 and FIG. 4. However, no such limitation is intended, and the correction of a data voltage may also be performed in a case where the color and luminance of a background and an image are different. The color of the background and the image may be a single color represented by only any one type of pixel such as red, green, and blue, or may be a color represented by a plurality of types of pixels such as gray. Note that, in the present specification, the solid image indicates an image in which the same data value is set in all pixels within a predetermined range. As described above, in the present embodiment, the correction of a data voltage is performed on pixels in the vicinity of the solid image. It is preferable to perform correction in a case where there is a difference in luminance between the solid image and the vicinity thereof, and the solid image may have a larger luminance or a smaller luminance.

In the above description, a case where evaluation is performed has been described in detail, and a solid image in which a shape or color is intentionally aligned has been described. However, luminance unevenness or the like may occur even in an image indicating an actual landscape (natural image) or the like. That is, even when it is not a solid image itself, there is the same problem in a natural image, which is close to the solid image, in which an image of different gray scales having a certain width or more is present in a background in which pixels having the same gray scale are aligned, and it is preferable to eliminate luminance unevenness. Examples of the natural image described above include various types such as an image in which a blackish oblong object is present in the gray sky.

Next, a case where correction is performed using a correction table different from that in FIG. 9 will be described with reference to FIGS. 11 to 13.

FIG. 11 is a table illustrating an example of a correction table showing a relationship between a rank difference and the amount of correction.

In the correction table illustrated in FIG. 11 (correction table for each rank), a relationship between a rank difference and the amount of correction is set for each of ranks "0" to "7". Note that, in FIG. 11, a portion of the correction table for each rank is omitted, but an appropriate value is only required to be set for the amount of correction in accordance with a configuration of the display device 10.

When the correction table for each rank is used, a rank of an n-th row to be corrected is referred to in a step of determining the amount of correction (step S05 described above). For example, in a case where the rank of the n-th row is "6", and a rank difference between an n−1-th row and the n-th row is 3, a column in which a rank in the correction table in FIG. 10 is "6" is referred to, and it is determined that the amount of correction is "−0.16".

FIG. 12 is a table illustrating an example of a correction table showing a relationship between a rank difference and the amount of correction.

In the correction table (multi-row correction table) illustrated in FIG. 12, a relationship between a rank difference and the amount of correction is set for each of ranks "0" to "7" as in FIG. 11, and the amount of correction is also set for each of an "n-th row", an "n+1-th row", and an "n+2nd row". For the column of the "n-th row", the amount of correction is set to be gradually decreased when a rank and a rank difference are the same in the "n+1-th row" and the "n+2nd row". Note that, in FIG. 12, a portion of the multi-row correction table is omitted, but an appropriate value is only required to be set for the amount of correction in accordance with a configuration of the display device 10. Processing using the multi-row correction table will be described along with a processing flow illustrated in FIG. 13.

Figure 13:
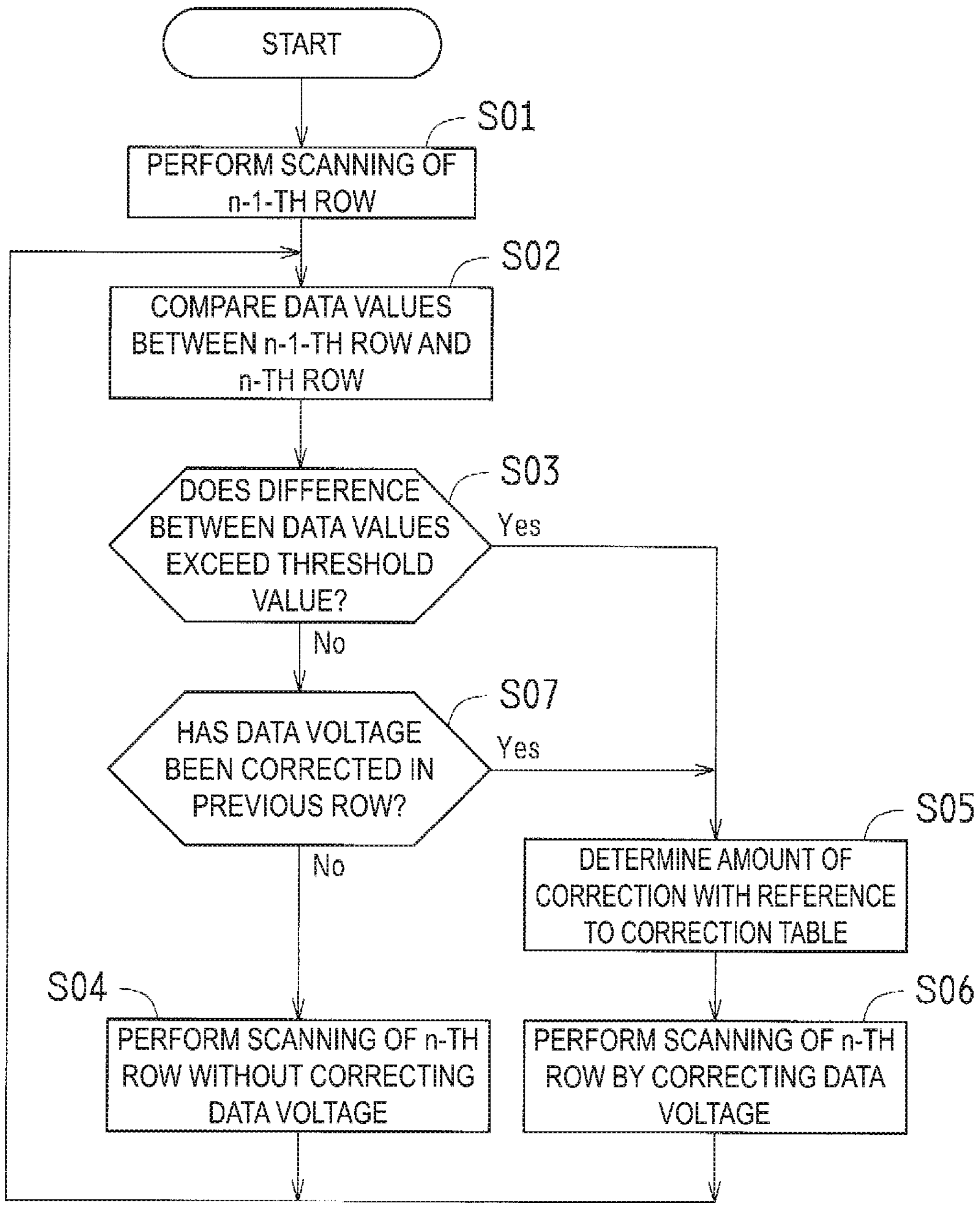
FIG. 13 is a processing flowchart illustrating a driving method including correction of data voltages in the display device.

FIG. 13 is a processing flowchart illustrating a driving method including correction of data voltages in the display device.

The processing flow illustrated in FIG. 13 differs from the processing flow illustrated in FIG. 9 only in that step S07 is added, and thus the processing of step S07 and the processing before and after step S07 will be described, and descriptions related to other steps are omitted. Specifically, in the processing flow illustrated in FIG. 13, in a case where a difference between data values exceeds a threshold value in step S03 (step S03: Yes), the processing proceeds to step S07.

In step S07, the display control unit 2 determines whether a data voltage has been corrected in the previous row. That is, for the n-th row for which it is determined whether a data voltage has been corrected, it is determined whether a data voltage has been corrected in the previous n−1-th row. As a result, in a case where a data voltage has been corrected in the previous row (step S07: Yes), the processing proceeds to step S05. On the other hand, in a case where a data voltage has not been corrected in the previous row (step S03: No), the processing proceeds to step S04.

In a case where the processing has gone through step S07, the amount of correction may be determined with reference to the multi-row correction table in step S05. Specifically, in step S05, a column to be referred to in the multi-row correction table changes depending on whether a data voltage has been corrected in the previous row. For example, in a case where a data voltage is first corrected for a 400th row (G400), the amount of correction is determined with reference to the column of the "n-th row" in the multi-row correction table. Next, in a case where a difference between data values does not exceed a threshold value for a 401st row (G401) (step S03: No), a data voltage has been corrected in the 400th row which is one row prior to the 401st row, and thus the processing proceeds to step S05 through step S07. In this case, for the 401st row, the amount of correction is determined with reference to the column of the "n+1-th row" in the multi-row correction table. In addition, similarly, for a 402nd row", the amount of correction is determined with reference to a column of an "n+2nd row" in the multi-row correction table.

In the multi-row correction table described above, the columns of three rows are provided. However, no such limitation is intended, and columns of more rows may be provided. For example, the number of rows for which correction is performed may be appropriately changed by providing columns of an "n+3rd row" and an "n+4th row" and correcting a data voltage for the continuous five rows, or the like.

Second Embodiment

Next, a display device according to a second embodiment of the disclosure will be described with reference to the drawings. Note that the second embodiment has substantially the same configuration as that of the first embodiment, and thus the drawings are omitted.

The second embodiment differs from the first embodiment in terms of data values to be compared by a display control unit 2. In the first embodiment, data values are compared collectively for a red pixel, a green pixel, and a blue pixel in a pixel unit, but in the second embodiment, data values are compared individually for a red pixel, a green pixel, and a blue pixel.

Specifically, in the second embodiment, the sum of data values is calculated by extracting only gray scale data of green pixels from pixel units of 1080 columns. In addition, the display control unit 2 determines the amount of correction by comparing the sums of data values in only green pixels for an n-th row and an n+1-th row. Note that a rank table or a correction table which is provided in the second embodiment may be substantially the same as that in the first embodiment, and for example, a total value at the time of determining ranks in the rank table may be appropriately adjusted. In this manner, it is possible to further increase an effect of correction of appearance by focusing on the luminance of a green color with a high luminous sensitivity for the human eyes.

In addition, the sum of data values may also be calculated for gray scale data of red pixels or gray scale data of blue pixels and is not limited to the above-described method. That is, the display control unit 2 determines the amount of correction by comparing the sum of data values in only red pixels, the sum of data values in only green pixels, and the sum of data values in only blue pixels with each other in the n-th row and the n+1-th row. For determination of whether to perform correction, conditions may be appropriately set. For example, when a rank difference occurs between data values in only any one pixel, correction may be performed regardless of results in other pixels, and when a rank difference occurs between data values for each of all pixels, correction may be performed.

Third Embodiment

Next, a display device according to a third embodiment of the disclosure will be described. Note that the third embodiment has substantially the same configuration as that of the first embodiment, and thus the drawings are omitted.

The third embodiment differs from the first embodiment in that pieces of gray scale data themselves are compared, and numbers in which a difference therebetween exceeds a threshold value are compared. Specifically, in the third embodiment, comparison of gray scale data is performed between pixels positioned in the same columns for an n-th row and an n+1-th row. Description will be given with reference to, for example, FIG. 6. When focusing on a 500th column (500RGB) in a case where a 200th row (G200) and a 201st row (G201) are compared, gray scale data in a pixel of (G200, S1498) and gray scale data in a pixel of (G201, S1498) are compared, and it is determined whether a difference therebetween exceeds a threshold value. In addition, similarly, gray scale data in a pixel of (G200, S1499) and gray scale data in a pixel of (G201, S1499) are also compared. In this manner, it is determined whether a difference in gray scale data exceeds a threshold value for each of all columns, and the number of pixels exceeding the threshold value (the number of disparity pixels) is calculated. In a correction table in this case, the number of disparity pixels and the amount of correction are associated with each other, and the larger the number of disparity pixels, the larger the amount of correction is set. In the present embodiment, data values are compared between pixels positioned in rows adjacent to each other and the same column, and correction based on a difference in luminance between adjacent pixels can be performed.

The display device 10 according to the present embodiment is not particularly limited as long as the display device is a display panel including a display element. Examples of the display element include a display element having luminance or transmittance controlled by a current and a display element having luminance or transmittance controlled by a voltage. Examples of the display element controlled by a current include an Organic Electro Luminescent (EL) display equipped with an Organic Light Emitting Diode (OLED), an EL display such as an inorganic EL display equipped with an inorganic light emitting diode, a Quantum dot Light Emitting Diode (QLED) display equipped with a QLED, and the like. In addition, examples of the display element controlled by a voltage include a liquid crystal display element and the like.

Note that the presently disclosed embodiments are illustrative in all respects, and do not become a basis of limited interpretation. Accordingly, the technical scope of the disclosure is not to be interpreted only by the above-described embodiments, but is defined based on the description of the claims. In addition, all modifications within the meaning and scope equivalence to the scope of the claims are included.

The invention claimed is:

1. A display device comprising:

pixel circuits provided in a matrix shape in a display region;

a scanning signal line, a data signal line, a first power supply voltage line, and a second power supply voltage line connected to the pixel circuits;

a scanning signal line drive circuit configured to apply a voltage to the scanning signal line;

a data signal line drive circuit configured to apply a voltage to the data signal line; and a display control unit configured to control the scanning signal line drive circuit and the data signal line drive circuit, wherein the pixel circuits include a display element, a holding capacitor, and a drive transistor, and are configured, when the scanning signal line is selected, such that a voltage of the data signal line corresponding to the selected scanning signal line is written in the holding capacitor as a data voltage, the drive transistor includes a first conduction terminal connected to the first power supply voltage line, a second conduction terminal connected to the second power supply voltage line through the display element, and a control terminal connected to the first power supply voltage line through the holding capacitor, the display control unit compares data values written in pixels in an n-th row corresponding to the selected scanning signal line with data values written in pixels in an (n−1)-th row being one row prior to the n-th row of the selected scanning signal line, and corrects the data voltage corresponding to the pixels in the n-th row in a case where a difference between the data values is equal to or greater than a threshold value, and the data values are values obtained by extracting a portion of a gray scale data indicating a gray scale in each of the pixels.

2. The display device according to claim 1, wherein the gray scale data is formed by a plurality of bits, and a value of high-order bits is set to be the data value.

3. The display device according to claim 2, wherein the display control unit further extracts the high-order bits formed by a plurality of bits.

4. The display device according to claim 1, wherein the display control unit further includes a rank table in which the data values are classified into a plurality of ranks.

5. The display device according to claim 1, wherein the display control unit further includes a plurality of correction tables in which an amount of correction for the data voltage is set, and selects one of the plurality of correction tables based on the difference between the data values.

6. The display device according to claim 1, wherein the display control unit further corrects the data voltage corresponding to the pixels in a row after the n-th row based on results of the comparison between the data values in the (n−1)-th row and the data values in the n-th row.

7. The display device according to claim 6, wherein the display control unit further applies a smaller amount of correction to the row after the n-th row than an amount of correction applied to the n-th row.

8. The display device according to claim 7, wherein the display control unit further applies a smaller amount of correction to an (i+1)-th row than an amount of correction applied to an i-th row, the i-th and (i+1)-th rows being rows after the n-th row.

9. The display device according to claim 1, wherein the display control unit further compares a sum of the data values written in the pixels in the n-th row and a sum of the data values written in the pixels in the (n−1)-th row.

10. The display device according to claim 9, wherein the pixels include a first pixel configured to emit light of a first color, a second pixel configured to emit light of a second color, and a third pixel configured to emit light of a third color, and the display control unit further compares sums of data values in the first pixel.

11. The display device according to claim 9, wherein the pixels include a first pixel configured to emit light of a first color, a second pixel configured to emit light of a second color, and a third pixel configured to emit light of a third color, and the display control unit further selects a correction table in which an amount of correction for the data voltage is set based on a result obtained by comparing sums of data values in the first pixel and determining whether the sums are equal to or greater than a first threshold value, a result obtained by comparing sums of data values in the second pixel and determining whether the sums are equal to or greater than a second threshold value, and a result obtained by comparing sums of data values in the third pixel and determining whether the sums are equal to or greater than a third threshold value.

12. The display device according to claim 1, wherein the display control unit further compares data values between pixels on the same data signal line when comparing the data values in the (n−1)-th row and the data values in the n-th row.

13. The display device according to claim 12, wherein the pixels include a first pixel configured to emit light of a first color, a second pixel configured to emit light of a second color, and a third pixel configured to emit light of a third color, and the display control unit further compares data values between pixels of a same color on a same data signal line.

14. The display device according to claim 13, wherein the pixels of the same color are green pixels.

15. The display device according to claim 1, wherein the display control unit corrects the data voltage in pixels around a solid image when displaying the solid image in which all pixels within a predetermined range have a same data value.

16. A display device comprising:

pixel circuits provided in a matrix shape in a display region;

a scanning signal line, a data signal line, a first power supply voltage line, and a second power supply voltage line connected to the pixel circuits;

a scanning signal line drive circuit configured to apply a voltage to the scanning signal line;

a data signal line drive circuit configured to apply a voltage to the data signal line; and a display control unit configured to control the scanning signal line drive circuit and the data signal line drive circuit, wherein the pixel circuits include a display element, a holding capacitor, and a drive transistor, and are configured, when the scanning signal line is selected, such that a voltage of the data signal line corresponding to the selected scanning signal line is written in the holding capacitor as a data voltage, the drive transistor includes a first conduction terminal connected to the first power supply voltage line, a second conduction terminal connected to the second power supply voltage line through the display element, and a control terminal connected to the first power supply voltage line through the holding capacitor, the display control unit compares data values written in pixels in an n-th row corresponding to the selected scanning signal line with data values written in pixels in an (n−1)-th row being one row prior to the n-th row of the selected scanning signal line, and corrects the data voltage corresponding to the pixels in the n-th row in a case where a difference between the data values is equal to or greater than a threshold value, and the display control unit includes a rank table in which the data values are classified into a plurality of ranks.

17. A display device comprising:

pixel circuits provided in a matrix shape in a display region;

a scanning signal line, a data signal line, a first power supply voltage line, and a second power supply voltage line connected to the pixel circuits;

a scanning signal line drive circuit configured to apply a voltage to the scanning signal line;

a data signal line drive circuit configured to apply a voltage to the data signal line; and a display control unit configured to control the scanning signal line drive circuit and the data signal line drive circuit, wherein the pixel circuits include a display element, a holding capacitor, and a drive transistor, and are configured, when the scanning signal line is selected, such that a voltage of the data signal line corresponding to the selected scanning signal line is written in the holding capacitor as a data voltage, the drive transistor includes a first conduction terminal connected to the first power supply voltage line, a second conduction terminal connected to the second power supply voltage line through the display element, and a control terminal connected to the first power supply voltage line through the holding capacitor, the display control unit compares data values written in pixels in an n-th row corresponding to the selected scanning signal line with data values written in pixels in an (n−1)-th row being one row prior to the n-th row of the selected scanning signal line, and corrects the data voltage corresponding to the pixels in the n-th row in a case where a difference between the data values is equal to or greater than a threshold value, and the display control unit includes a plurality of correction tables in which an amount of correction for the data voltage is set, and selects one of the plurality of correction tables based on the difference between the data values.

18. The display device according to claim 17, wherein an amount of correction of a data voltage corresponding to the pixels of the n-th row and an amount of correction of a data voltage corresponding to the pixels of a row after the n-th row are set in the selected correction table.

19. The display device according to claim 17, wherein the display control unit further selects one of the plurality of correction tables based on the difference between the data values, selects a correction table in which a large amount of corrections is set in a case where the difference between the data values is large, and selects a correction table in which a small amount of corrections is set in a case where the difference between the data values is small.

20. The display device according to claim 17, wherein, in the selected correction table, an amount of correction is set to be smaller for a second gray scale than for a first gray scale, the second gray scale has an amount of light emission of the display element smaller than an amount of light emission of the display element of the first gray scale.

* * * * *